United States Patent [19]

Woudsma

[11] Patent Number: 4,719,133

[45] Date of Patent: Jan. 12, 1988

[54] PROCESS FOR TREATING WOOD AS WELL AS PRODUCT FOR TREATING WOOD

[76] Inventor: Jacob Woudsma, Vogezenlaan 23, 5801 PX Venray, Netherlands

[21] Appl. No.: 762,481

[22] Filed: Aug. 5, 1985

[51] Int. Cl.⁴ ........................ B05D 1/18; C09K 15/00; B65D 85/84

[52] U.S. Cl. .................................. 427/440; 206/524.1; 206/524.4; 252/397

[58] Field of Search ............. 252/315.01, 315.1, 315.2, 252/315.3, 397, 315.4; 427/297, 440; 428/402.2, 402.21, 402.22; 71/DIG. 1; 206/524.1, 524.4

[56] References Cited

U.S. PATENT DOCUMENTS 4,174,412 11/1979 Tyrer et al. ..................... 427/440 X
4,344,857 8/1982 Shasha et al. ................ 428/402.2 X
4,563,212 1/1986 Becher et al. .................. 71/DIG. 1

FOREIGN PATENT DOCUMENTS 0050839 10/1981 European Pat. Off. .
732671 3/1943 Fed. Rep. of Germany .
928850 6/1955 Fed. Rep. of Germany .
2812697 3/1978 Fed. Rep. of Germany .

*Primary Examiner*—Michael R. Lusignan
*Attorney, Agent, or Firm*—Blum, Kaplan, Friedman, Silberman & Beran

[57] ABSTRACT

The invention relates to treating wood with a wood preservative by applying in one or more recesses made in the wood solid material together with the wood preservative in such a way that the solid material fills up the recesses at least partly, said solid material having a lower water content than the wood treated and exerts a reinforcing effect upon this wood, when it absorbs water and in result expands and/or when a permanent pressure is exerted upon it.

Furthermore, the invention relates to products to be used for this treatment, with which by one single act the filling-up of a recess in the wood to be treated and the closing thereof can be effected.

16 Claims, 13 Drawing Figures

Figure 1:
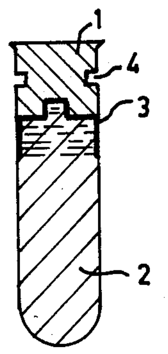

FIG. 12
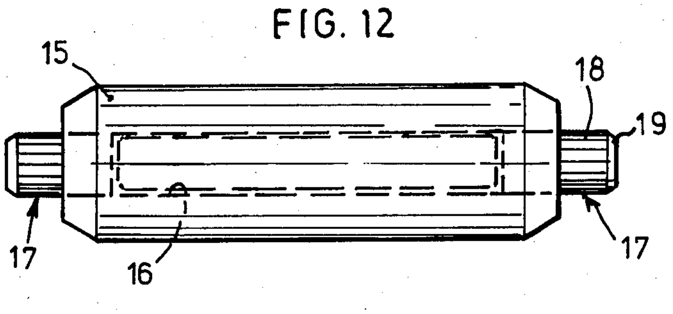
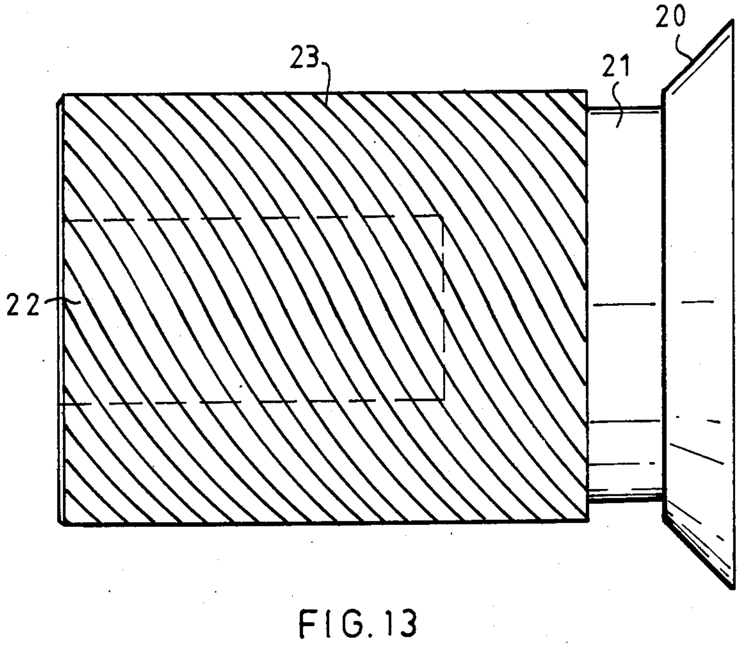
FIG. 13

PROCESS FOR TREATING WOOD AS WELL AS PRODUCT FOR TREATING WOOD

The invention relates to a process for treating wood in which a wood preservative as inserted into one or more recesses made in wood, whereupon these recesses are closed outwardly.

The treatment of wood with a wood preservative aims at protecting the wood preventively or curatively against attack by moisture, microorganisms (for instance Basidiomycetes, Ascomycetes, Fungi Imperfecti etc.), insects (for instance Hylotropes bajulus L., Anobium punctatum, Lyctus brunneus Steph., etc.), termites (for instance Calotermes flavicolis, Reticultermus Luciferus Rossi) and bacteria.

A similar process is generally known. Preferably a capsule is used. The process followed is then that first a hole is drilled in the wood, subsequently a glass capsule with the wood preservative is inserted into it and finally the drilling hole is closed with a plug, which is applied in it in a recess, in result of which the capsule breaks and its contents are freed and spread in the wood.

A drawback of this process is that wooden beams, window-frames, etc. forming part of supporting structures or wooden elements which are regularly charged, are weakened as a consequence of the remaining holes.

Another drawback is that the user of the capsules when breaking the capsules may come into contact with the contents thereof. This may happen because the plug does not close well or because the capsule is not positioned deep enough in the shallow drilling hole.

In Dutch patent application No. 77 03412 it is i.a. suggested to apply a water repelling agent in the recess.

In European patent application No. 81 108689.1 (published under No. 0050839) it is elucidated that the use of a water expellent agent give very great problems in practice with wood already painted. Not only is the expulsion of moisture strongly interfered with, but there also is a chance that locally the moisture content will increase as a result of the water expellent agent. If it rises above the critical value of 21% a chance of wood attack by developent of wood decay fungus is very great. Also, the paint system can be damaged as a result of moist accumulation on the surface of the wood. That is why in the European patent application it is proposed to apply a solution of a water binder in an organic solvent in recesses of a wooden product. In result hereof the objection of moisture accumulation is removed, but the application of a water binder has the drawback that the active substances which have to prevent wood attack, are locked up, in consequence of which a good penetration hereof in the wood is reduced. Consequently, also here the object aimed at, to wit prevention and combating, resp., of wood attack by micro-organisms, insects and bacteria is not fully achieved.

The invention provides a process which meets the above-mentioned drawbacks.

According to the invention in a process as mentioned at the beginning a solid material is applied in the recess together with the wood preservative in such a way that this solid material at least partly fills up the recess, said solid material having a reinforcing effect upon this wood when it absorbs water and expands in consequence thereof and/or when a permanent pressure is exerted upon it.

Preferably, also wood is applied having a lower water content than the wood treated, most preferably resin-free splint-wood or heart-wood. Splint-wood is young wood and has a less resin-rich cell structure than has for instance heart-wood. This property is of importance in view of the absorption capacity of the wood and the capacity to absorb free liquid. By applying wood for this which has been freed from resins and other fillers, this effect is not only strengthened, but it is also prevented that chemical reactions between the wood preservative substances and these resins and other fillers can occur.

It is preferable to apply the wood material that is applied in the recesses of the wood to be treated in such a way therein that the wood preservative present therein is released in the direction of the fibres of the wood material applied.—So that means that the fibre direction of the wooden plug is the radial direction so that the fibre direction is the same as that of the surrounding wood. This does not only give the big advantage that the delivery of the wood preservative to the surrounding wood is accelerated, but also that it also distributes itself more uniformly in the surrounding wood. In consequence the chance of problems in painting the wood over is reduced.

Owing to the process according to the invention a material being applied in the recesses together with the wood preservative having a lower water content that the wood treated, the wooden plug will start absorbing water after application and in result expand more than the directly surrounding wood shrinks. In result a reinforcing effect is exerted upon the surrounding wood.

It is generally known that by nature wood contains water. This water can be prsent in two forms, to wit bound to the cell walls, the so-called inhibition water, and as free water in the cell cavities and vessels. This water is usually indicated as capillary or occlusion water. This water is present only if the cell walls are completely saturated. When drying wood first the free water disappears from the cell cavities. In for instance deal the moisture bound, in other words the inhibition water, amounts to about 29% at a maximum. In drying at a relative humidity of 80% a wood humidity of about 17% is created, at which a shrinkage of 1.25% in radial and 0.1% in the fibre direction occurs.

A deal plug, which is provided with a wood preserving organic agent and a moisture content of about 10%, will expand after application in the wood to be treated which is in constant contact with the open air and in result thereof has a higher moisture content. In addition to the reinforcing effect this has on the surrounding wood also a stabilizing effect occurs because the moisture content of the plate treated decreases. This is in particular important for critical spots sensitive to wood attack. For if here the moisture content will surpass 21% the chance that the wood decay fungi most occurring in Europe, such as Polystictus versocolor, Coniopohra Puteana, Gloephillum tradeuym are developed, is very great.

The invention also relates to a product for treating wood, comprising a wood preservative, optionally packed in a wrapping of protective material, which wrapping is smashed up upon exertion of pressure from inside, said product being characterized in that that an absorbing material having a moisture content below 16% which expand on absorption of water, is present. It is preferably to have the absorbing material consist of wood, most preferably splint wood. Also cork is considered because it is a bit compressible. For if no protecting wrapping is applied it is advantageous to have the product according to the invention which is applied in a recess of the wood to be treated, taper a bit, so that the diameter of the portion of the plug which closes the recess present in the wood to be treated from the outside is somewhat larger than the bore-hole. For in consequence thereof the plug is anchored even more fixedly and no wood protective agent or glue which is present in the plug, can escape along the plug. If one wishes to glue the plug in the recess, one applies glue at the head of the plug and/or along the plug. By providing the plug with a recess, any excess of the glue is caught herein, so that the glue cannot some into contact with paint applied on the outside of the plug. In result thereof discoloration of the paint is prevented.

In a preferred embodiment of the wooden plug one also sees to it that the portion of the plug applied in the recess last is not oversaturated with the wood protective agent. This is of great importance in applying the plug for the sake of security of the users. Also, this has the great advantage that the wood protective agent cannot splash or run off after opening the packing or cann run off in open seams of window frames.

In order that one does not meet with problems when painting the wood treated over, the impregnated plug can be provided on one end with an impermeable medium, for instance a galvanized wood screw, which closes the whole boring hole opening when applied. It is also possible to apply a non-impregnated plug on one end which by means of a compressible sealing disc for instance of aluminium foil is separated from the impregnated portion.

The invention is further illustrated with the aid of a number of embodiments, which are represented by FIGS. 1–9 incl.

The plug according to FIG. 1 substantially consists of absorbent material having a low water content, for instance cork, wood flour, wood shavings, etc. Portion 1 is not impregnated with a wood protective agent.

Portion 2, however, is impregnated with the wood preservative. Both portions are mutually separated by a film of compressible material 3, which may for instance consist of a remainder of the packing material in which the plug was packed before use or of glue or resin. Partition 3 prevents the wood preservative in the impregnated portion 2 from penetrating in the non-impregnated portion 1, when in applying the plug in a recess of wood pressure is exerted on portion 1. If in the absorbent material a glue is present, the glue runner 4 sees to it that any excess of glue present cannot escape outwards.

When the plug of FIG. 1 is inserted into a recess and a pressure is exerted from outside, the impregnated portion clamps in the non-impregnated portion.

Figure 2:
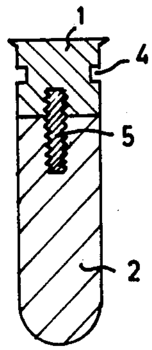

In the embodiment according to FIG. 2 the connection between the non-impregnated and impregnated portions is realized by means of a galvanized headless iron screw 5. Also a screw made of plastic material, for instance polyurethane, is considered.

Figure 3:
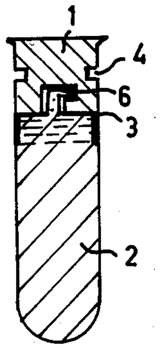

In the embodiment according to FIG. 3 the connection between the non-impregnated portion and the impregnated portion of the absorbent material is effected by means of a bayonet catch. By using a spring 6 on the inside and a compressible packing, both portions can expand without the total length of the plug being influenced. This is of great importance in view of the stability of the plug in the wood and for a paint layer applied thereover.

Figure 4:
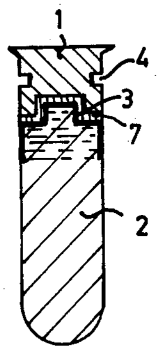

In the embodiment according to FIG. 4 use has been made of a plastic compressible glue layer 7. Because hereof the packing material 3 closing the impregnated portion need not be compressible.

Figure 5:
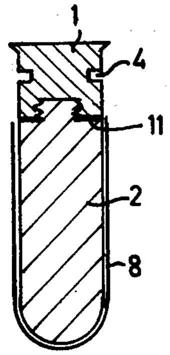

In the embodiment according to FIG. 5 use is made of a glass capsule 8, to which a non-impregnated plug 1 has been screwed. A sealing ring 11 made of for instance cork with aluminium foil or rubber sees to it that the wood protective agent in the impregnated portion 2 cannot diffuse in the portion 1. When smashing in this capsule the glass wrapping breaks and the broken glass and the absorbent material are impressed in such a way that the whole boring hole is filled up completely all the same. After some time the absorbent mass will expand by moisture absorption from the surrounding wood and extra reinforce the whole.

Figure 6:
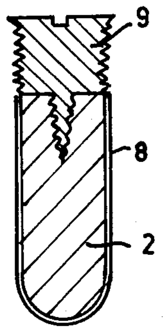

FIG. 6 also relates to an embodiment with a glass wrapping. In this embodiment a galvanized iron screw 9 is present. When placing the capsule the screw will smash the glass wrapping and will in consequence be anchored fixedly in the surrounding absorbing material. This embodiment has the advantage that no glue need be used, whilst moreover no wood protective agent can escape along the screw. There is no chance of splashing when applying the capsule either. The whole can be finished with a wood repair agent, so that also the substrate for the paint system to be applied over it is fully suitable for applying the paint over it.

Figure 7:
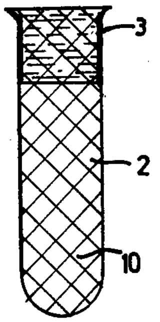
Figure 8:
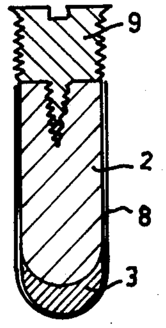

In the embodiment according to FIG. 7 use is only made of an impregnated plug 10 which is reinforced with nylon or galvanized gauze. Also this offers the advantage that no contact between the wood protective agent and the user can take place. The layer of sealing material 3, which for instance can consist of aluminium foil reinforced with paper prevents the wood protective agent from penetrating towards the paint on the outside of the wood treated. This effect can even be reinforced by finishing the whole with a two-components glue, which is impermeable to polar and apolar organic liquids.

In FIG. 8 use is again made of a galvanized iron screw, whichis screwed in the impregnated portion of the absorbent material. By applying on the other end of the compressible material a compressible foil 3, the plug can expand without the total length of the whole product being longer. This foil does see to a reinforcement of the whole.

Figure 9:
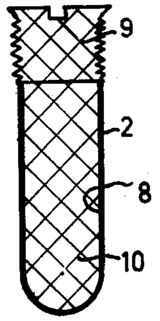

In the embodiment according to FIG. 9 use is made of a flat screw 9 of galvanized iron or a plastic and a closed capsule of glas. The capsule is surrounded by a thin foil of plastic, for instance polyethylene foil or of polyvinylchloride foil. The whole is constructed such that after application of the glass capsule in the boring hole the capsule can be smashed by screwing the screw on. In case of a correct selection of the contents of the capsule, to wit by seeing to it that an organic liquid is present therein, in which the foil of plastic surrounding the glass capsule initially, dissolves, the wood protective agent can penetrate the wood to be protected.

Instead of with a plastic foil the capsule with screw can also be wrapped in nylon or galvanized gauze (8). Also this packing need not be removed, no more than a wrapping of plastic foil before applying the capsule in the boring hole. This embodiment has the advantage over the known capsule, the wrapping of which consists wholly of glass, that after inserting the capsule into the boring hole, the screw applied as closure is inserted into the boring hole simultaneously with the capsule. When using the known capsules after application of the capsule for closing the boring hole a closing plus is to be applied in a separate act. It then could happed that such a plug was inserted after it had been forgotten to apply first the glass capsule. This is impossible when applying a closing screw, which is applied integrally with the capsule.

Figure 10:
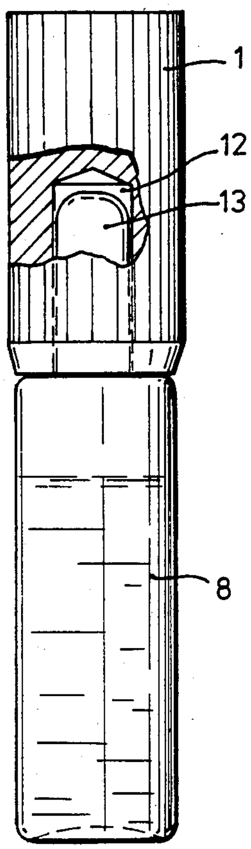

FIG. 10 relates to an embodiment in which use is made of a unit consisting of a sealed capsule (8) of smashable material, for instance glass, filled with a solution of a wood preservative and a plug (1) of material impermeable to wood preservative, for instance heartwood, fixedly connect herewith for instance by glueing. If the plug consists of hardwood, in particular of European oak, the plug moreover does not deform in smashing. When the plug is internally provided with a cavity (12) into which a protruding portion (13) of the sealed capsule fits, yet a relative large amount of wood preservative can be taken up into the unit, although a large part of the length of this unit is taken by the plug. This is in particular of importance when treating wood structures having a smaller thickness, for instance window-frames.

In general it is advantageous to select the wrapping material of the capsule, for instance the glass such that it does not transmit ultra-violet light. Thie promotes the keeping qualities of the wood preservative present in it.

Figure 11:
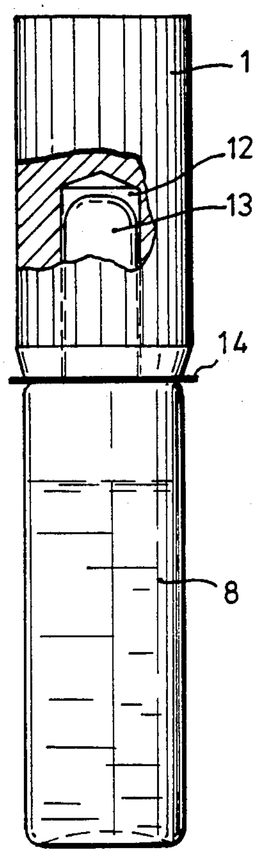

FIG. 11 relates to a variant of the connection of the plug with the capsule according to FIG. 10. Between the plug (1) and the collar of the capsule 8 there is an elastic ring 14, for instance of rubber or plastic, whose lower side has an opening of a somewhat smaller diameter than the drilling hole. Preferably this ring is O-shaped. The presence of this ring sees to it that the plug (1) is automatically centered, which is important in automized production. The ring may not be too thick, ±1 mm, because otherwise the ampulla can hardly be broken.

The plug 1 generally acts water controlling. After application it absorbs water, but after the wood preservative has penetrated into the wood to be protected, the plug can again release water, if the surrounding wood dries up.

It is also possible to process the products shown in FIGS. 1-10 into dowels made of wood, e.g. beech, European oak or merbau wood. Dowels are used for accomplishing pin hole connections between wooden parts, e.g. of window-sills, windows and doors. In general such dowels have a himidity content of less than 10% by weight. If the dowels known per se (vide e.g. FIG. 12) are provided with a pre-drilled recess, which possibly is extending over the entire length thereof a product according to one of the figures can be introduced into that recess, whereupon the recess is sealed by a wooden plug (or two plugs if the recess is extending over the entire length). This is shown in FIG. 12. In this FIG. 15 represents a dowel into which a recess 16 having a diameter of e.g. 16 mm and a length of 100 mm has been drilled over the entire length. Into said recess a product, e.g. according to FIG. 10, has been introduced, while the open ends of the recess 15 are sealed by wooden plugs 17, which are provided with guiding edges 19. As soon as the dowel is applied for connecting wooden parts the plugs are pressed inwardly. The dowel is longitudinally provided with small grooves for distributing the glue, by means of which the dowel is glued in the wooden parts. The wood preservative is distributed into the surrounding wood immediately when the ampulla is smashed when the wooden plugs take up water. This can take place via the dowel or through the plugs, dependent on the kind of material chosen, e.g. the kind of wood or synthetic material, combined with each other or not.

It is also possible to provide the plug(s) beforehand with recesses, so that the wood preservative can spread more easily or earlier in the surrounding wood.

It appeared to be advantageous, particularly when placing the ampulla in horizontal bore-holes in the wood, to provide the plug made of wood or another material with parallel pitches. For if an excess of pressure develops at a high degree of filling of the ampulla it cold happen that some liquid is pressed outside along the plug. When parallel pitches are present in the plug in each pitch a separation between gas and liquid takes places, the gas being gathered in the upper portion of each pitch when the plug's position is horizontal. So the gas can escape from the upper portion of the horizontal plug along the plug, so that the excess of pressure disappears and the danger of liquid filtering through is prevented. To elucidate this reference is made to FIG. 13. FIG. 13 relates to a plug with parallel pitches 23 which are bevelled in respect to a plug axis. Besides an extra provision is made in this plug in order to prevent filtering through of liquid after placing the ampulla in the wood to be preserved. The plug is provided with a stopping edge 20 having a diameter which is somewhat larger than the other part of the plug. In order to apply the above described plug a special, adapted form of the bore-hole is required. This can be obtained by drilling a hole first to standard depth, after which the first part of the bore-hole is drilled to the desired size with a drill having a larger diameter.

In the shown plug under the stopping edge (20) an annular space 21 is left blank to take up glue, when the stopping edge is provided with a layer of adhesive to glue the ampulla in the wood to be preserved.

The hollow space 22 has been left blank to insert the upper portion of the ampulla therein.

Finally, it is remarked that the expression wood preservative is to be understood in the broadest sense. Also agents, which as such do not exert a killing effect on living organisms, but see to a medium in which living organisms cannot multiply are meant. For instance, a solution of paraffin in an organic solvent can be applied. When this solution penetrates into the space between the wood fibres and the organic solvent evaporates partially, the paraffin remains in the spaces, in result of which no living organism can develop therein.

I claim:

1. A process for treating wood having at least one recess, comprising inserting a wood preservative and a solid material having a lower water content than the wood into at least one recess in the wood so as to at least partially fill and outwardly close the at least one recess, whereby the solid material exerts a reinforcing effect on the wood when water is absorbed by the solid material.

2. A process according to claim 1, wherein the solid material is resin-free splint wood or heart-wood.

3. The process of claim 1, wherein the solid material has fibers and the wood preservative is impregnated in the solid material and is delivered to the recessed wood in the direction of the fibers of the solid material.

4. The process of claim 3, wherein the solid material is resin-free splint wood or heart-wood.

5. A process according to any one of cliams 1, 2, 3 or 4, wherein the wood preservative and solid material are encapsulated in a smashable material and wherein the process further comprises smashing the capsule after insertion of the capsule into the at least one recess.

6. The process of claim 5, wherein the smashable material is glass.

7. The process according to any one of claims 1, 2, 3 or 4, wherein the wood preservative is present as a solution in a capsule of smashable material and the solid material is present at one end of the capsule, said one end disposed at the surface of the recess and wherein the process further comprises the step of smashing the capsule by forcing the solid material into the capsule after insertion of the capsule into the at least one recess.

8. The process of claim 7 wherein the smashable material is glass.

9. A product for the treatment of wood comprising an absorbent material having a wood preservative impregnated portion and a wood preservative non-impregnated portion and wherein the wood preservative impregnated portion is separated from the non-impregnated portion by means of a compressible sealing disc.

10. A product consisting of a capsule of smashable material having at least a wood preservative and a solid material therein.

11. A product consisting of a sealed capsule of smashable material having a solution of wood preservative therein and a plug of wood preservative impermeable material affixed on top of the capsule.

12. The product of claim 10, wherein the absorbent material has a moisture content of less than about 16% by weight and whereby the absorbent material expands in the presence of water.

13. The product of either of claims 10 or 12 further comprising a screw adapted to smash the capsule when the capsule is placed in a recess in wood to be treated.

14. The product of claim 10, wherein the smashable material is glass.

15. The product of claim 11, wherein the wood preservative impermeable material is heartwood.

16. The product defined in any one of claims 9, 10, 11 mounted in a dowel.

* * * * *